Jan. 18, 1949. G. M. DYE ET AL 2,459,509
FILM PROCESSING MACHINE
Filed March 25, 1943 8 Sheets-Sheet 2
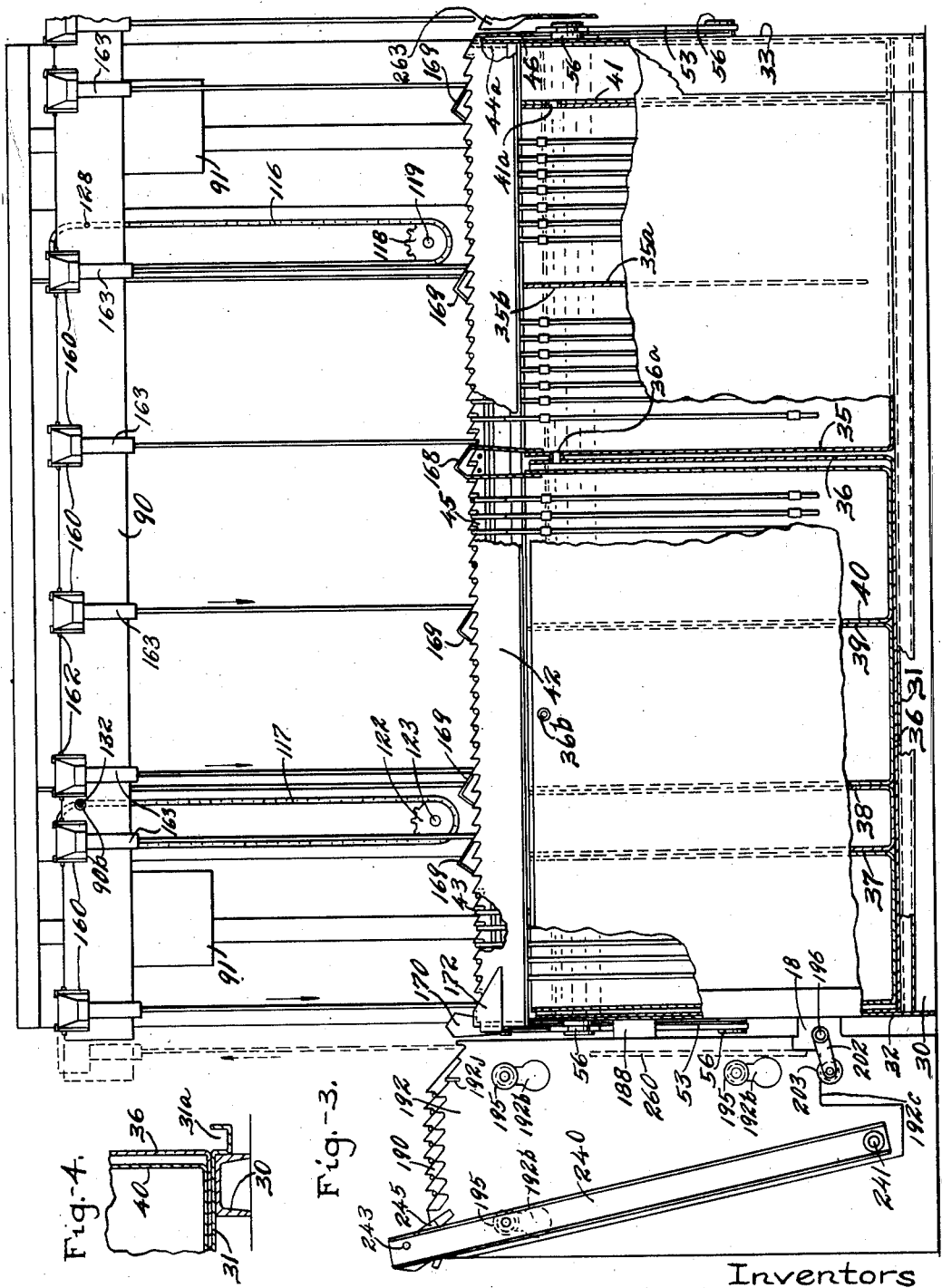
Inventors
GLEN M. DYE, RALPH B. MADDOCK
ROBERT SARDESON, EDWARD H. SAVELA
By Chas. C. Reif
ATTORNEY

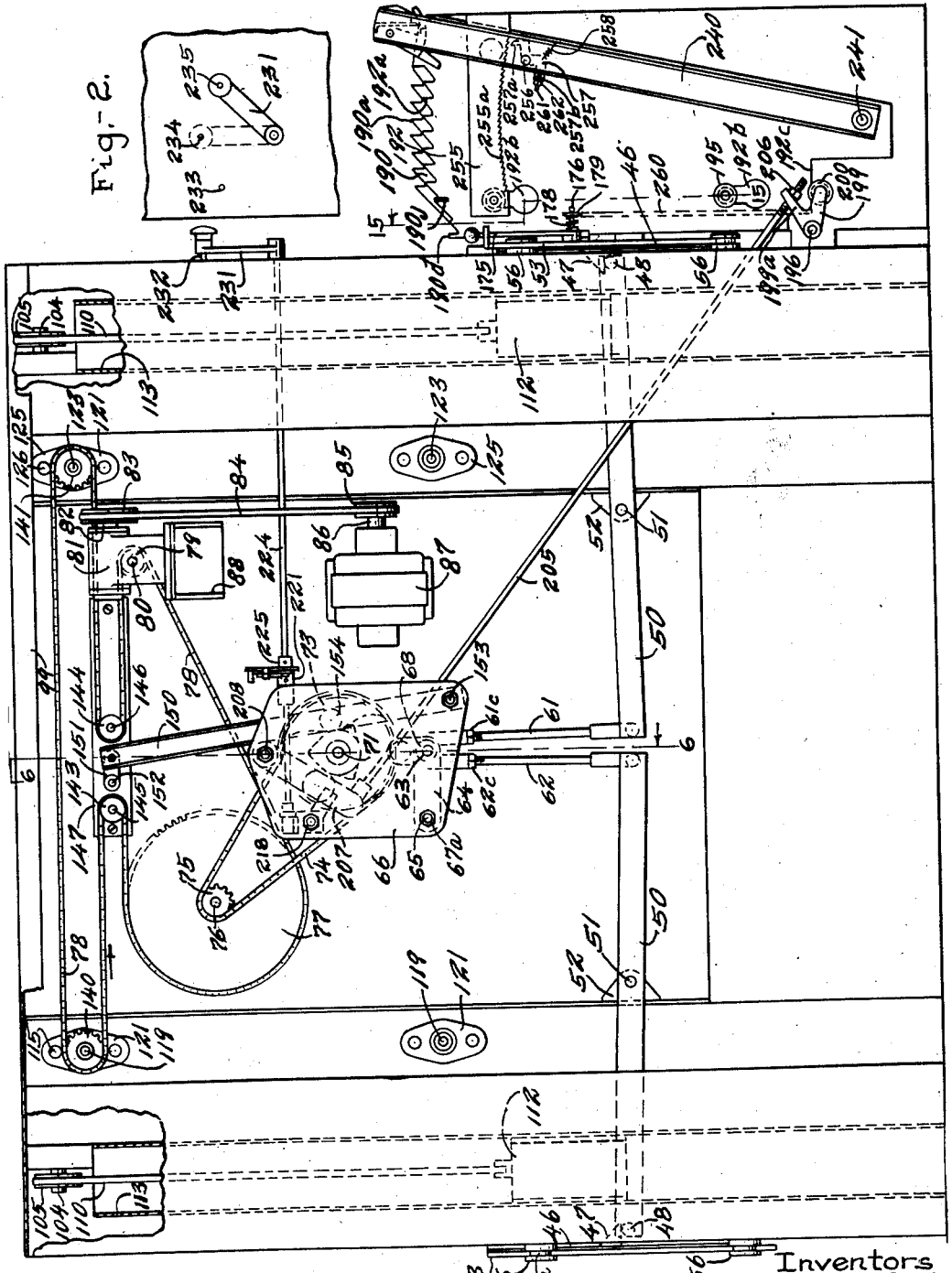

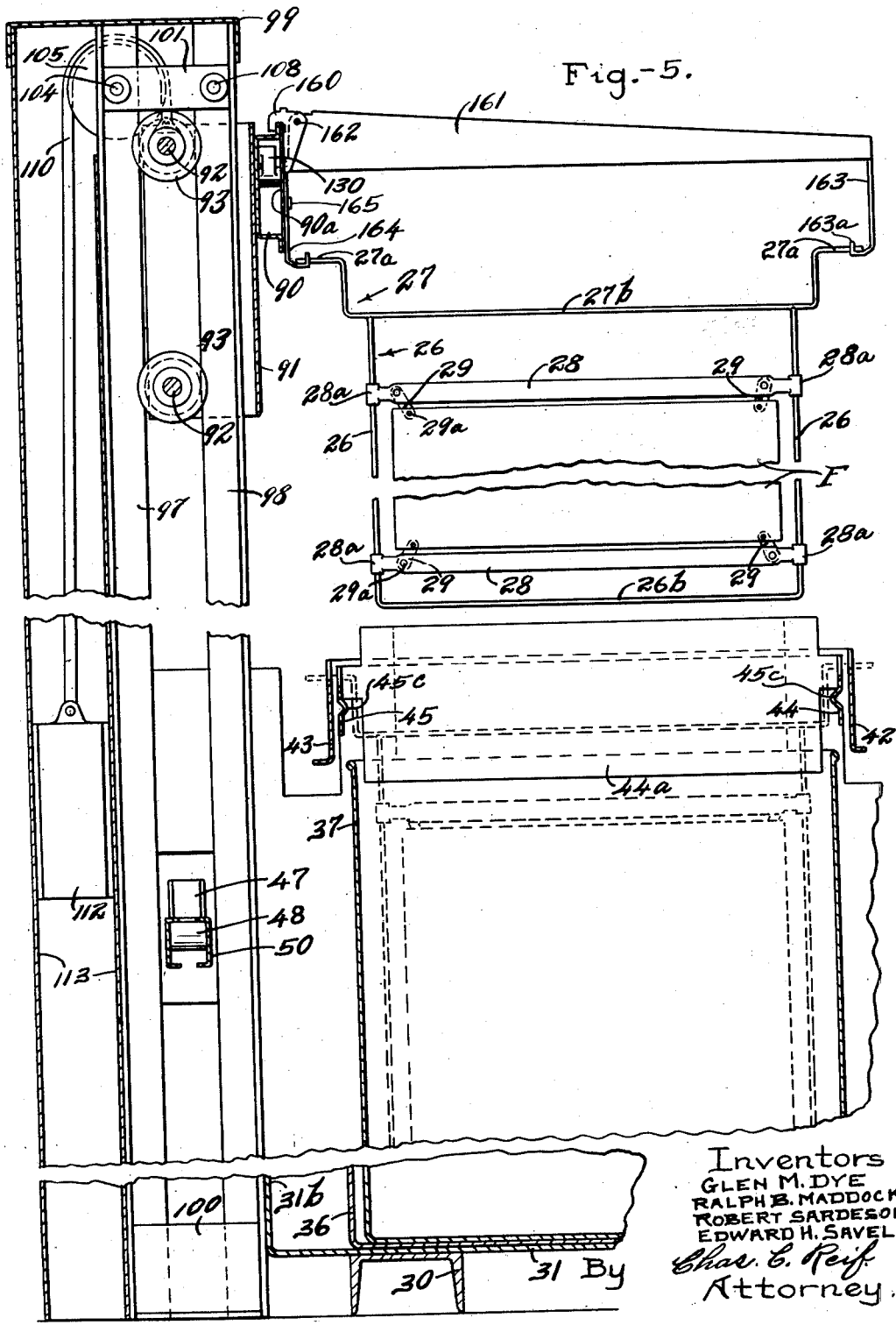

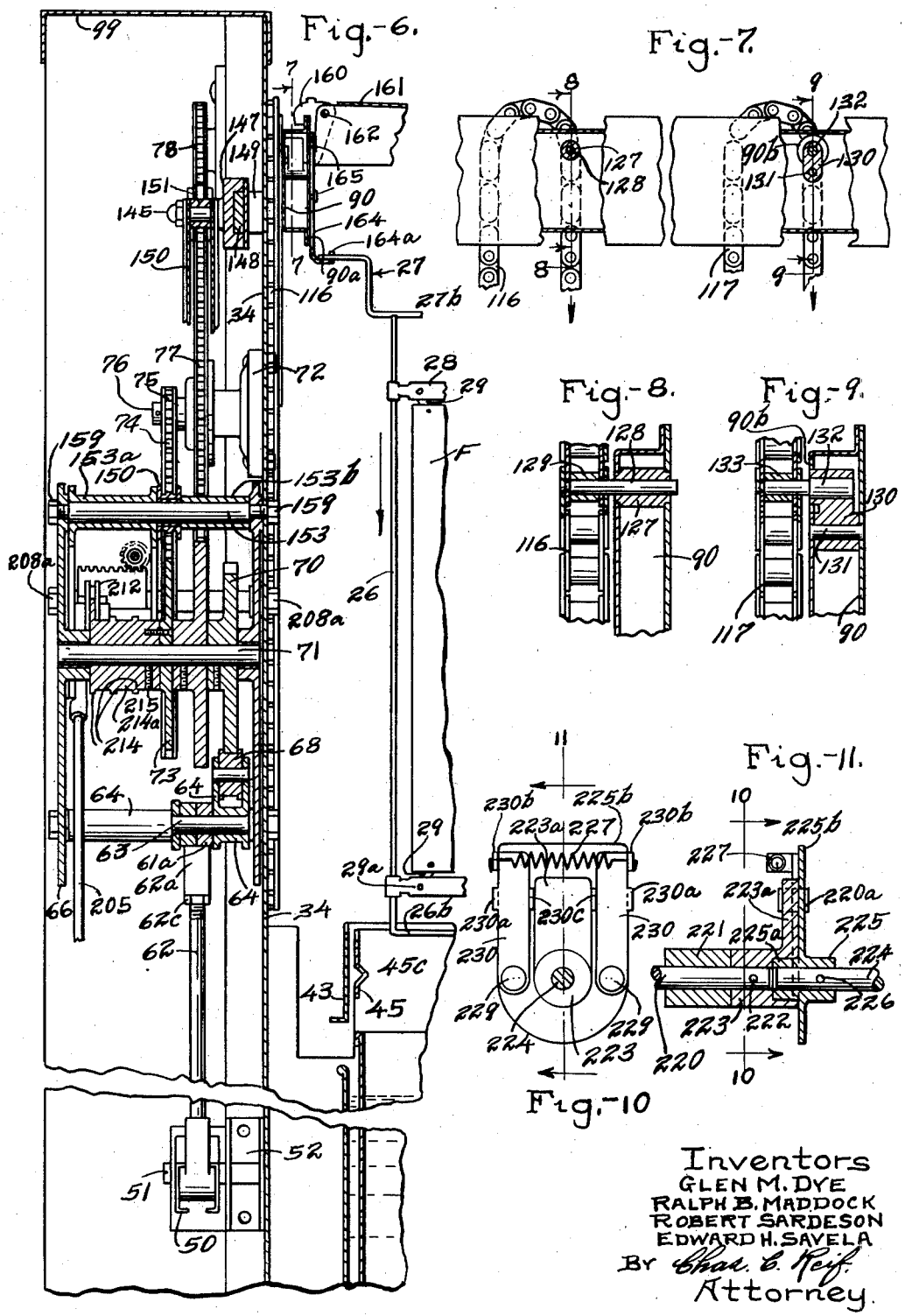

Jan. 18, 1949.　　　G. M. DYE ET AL　　　2,459,509
FILM PROCESSING MACHINE
Filed March 25, 1943　　　8 Sheets-Sheet 5
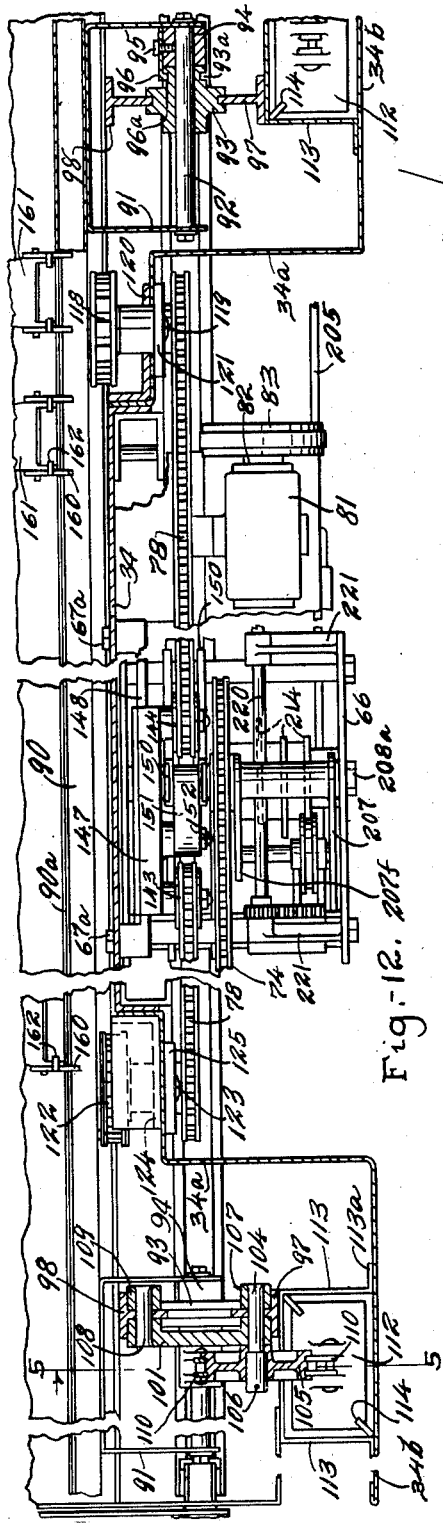
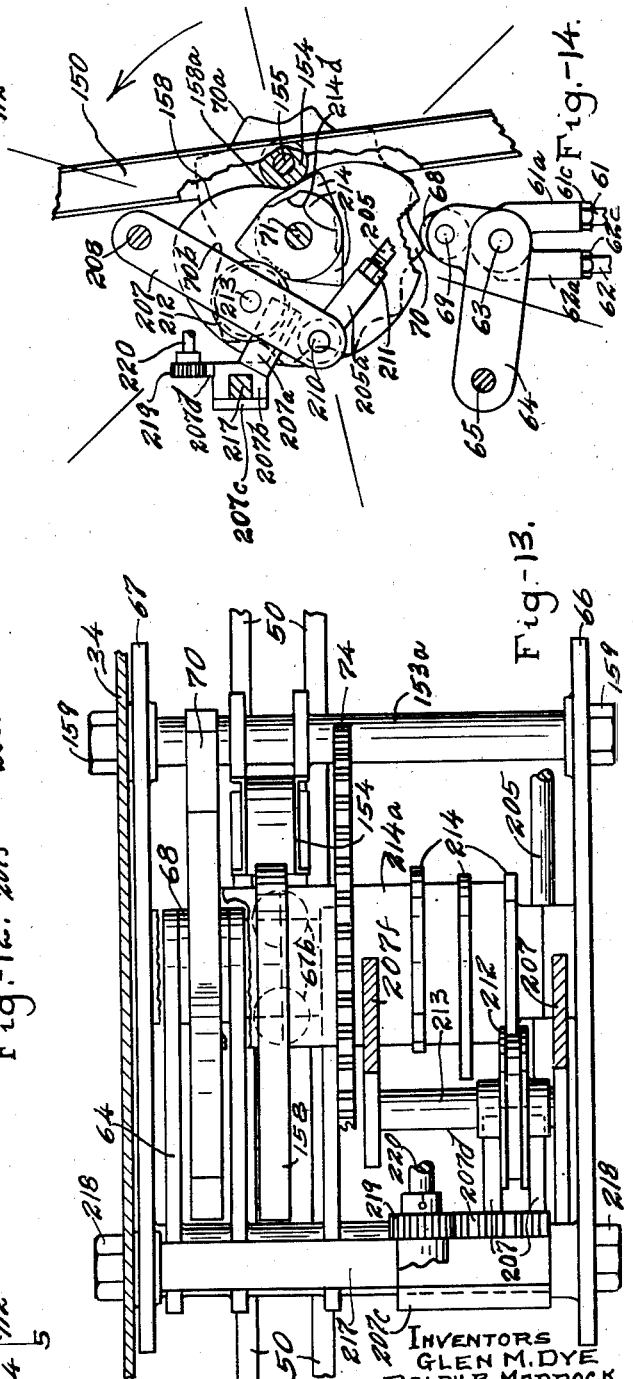
INVENTORS
GLEN M. DYE
RALPH B. MADDOCK
ROBERT SARDESON
EDWARD H. SAVELA
By Chas. C. Rey
Attorney.

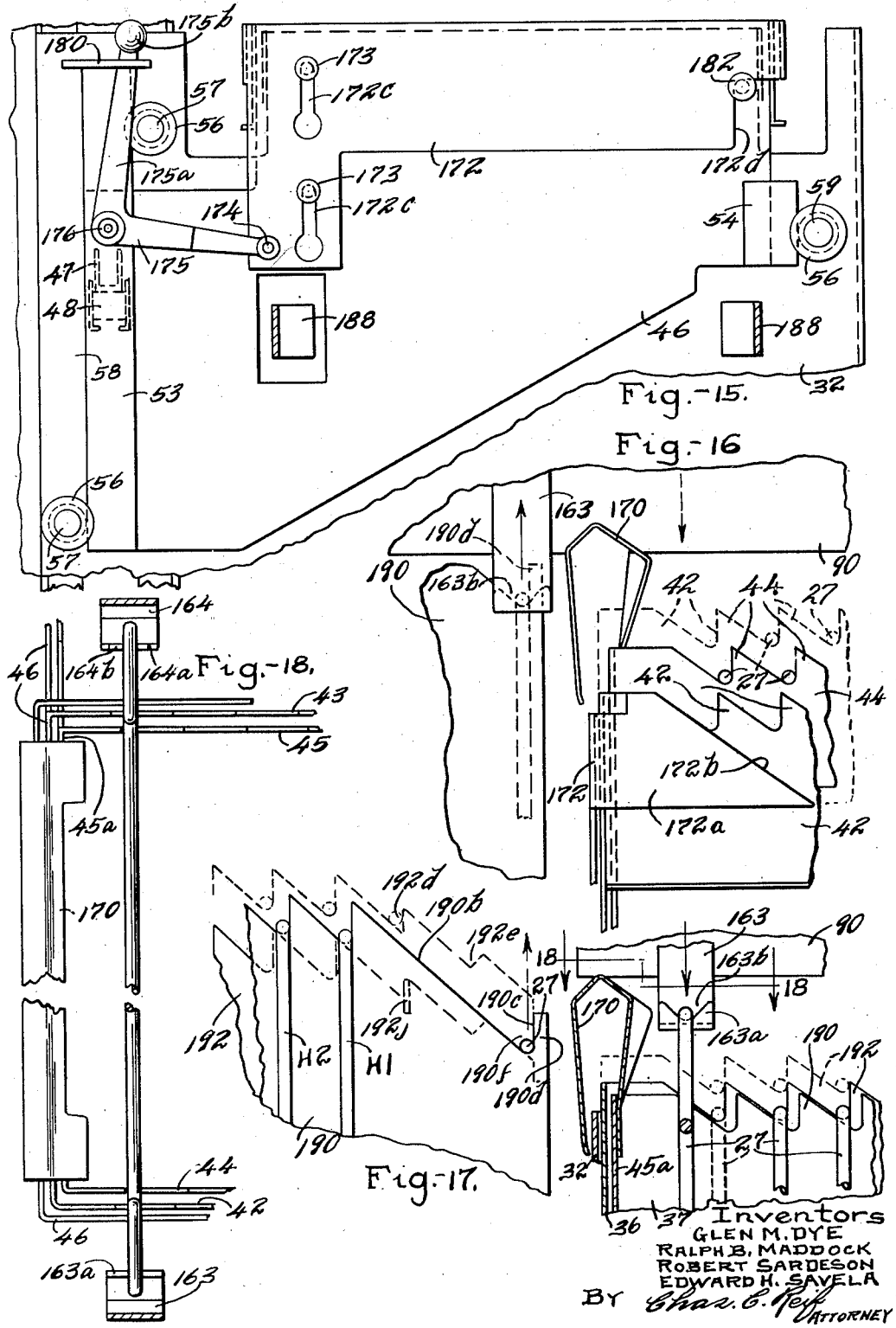

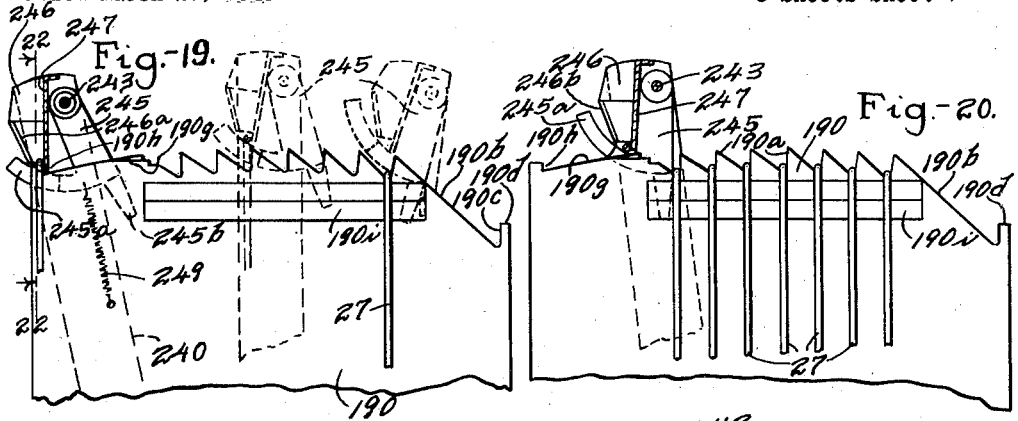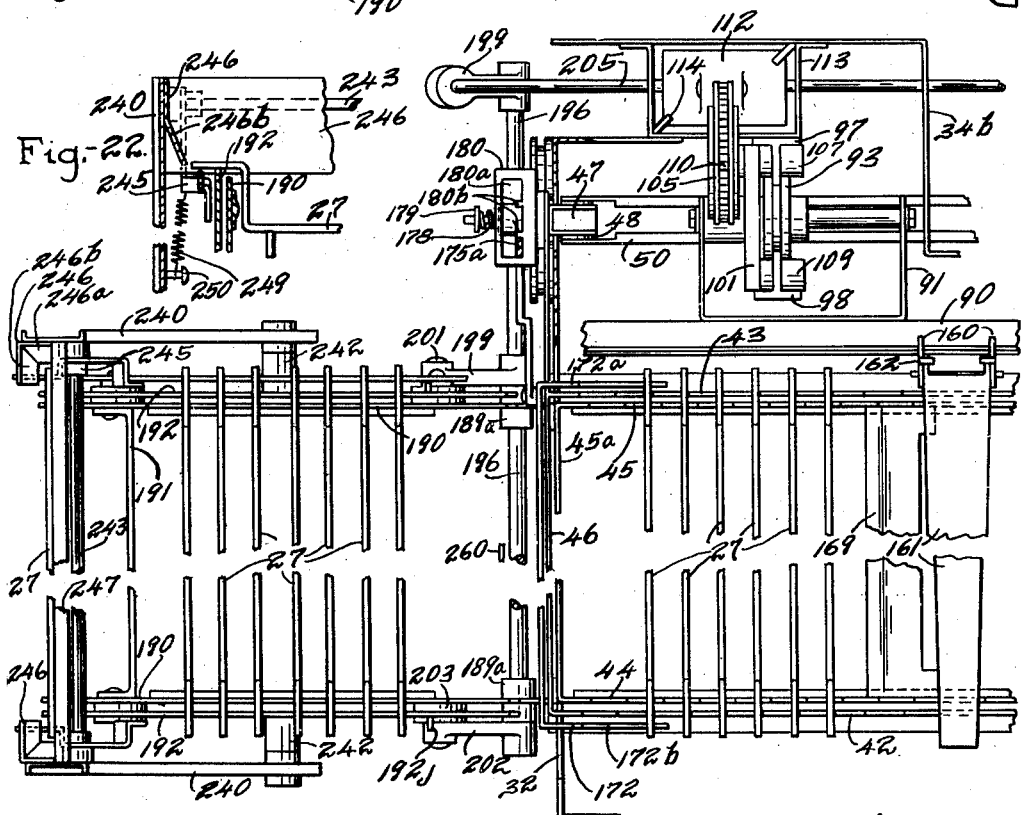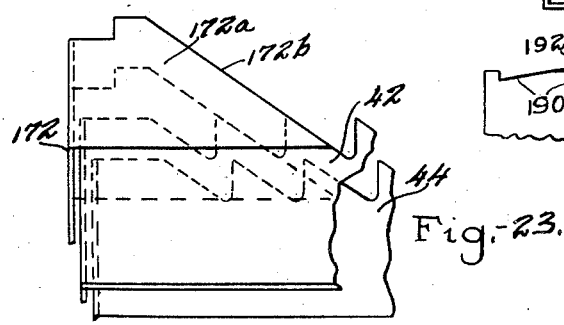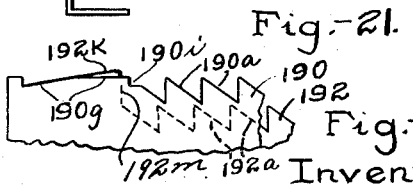

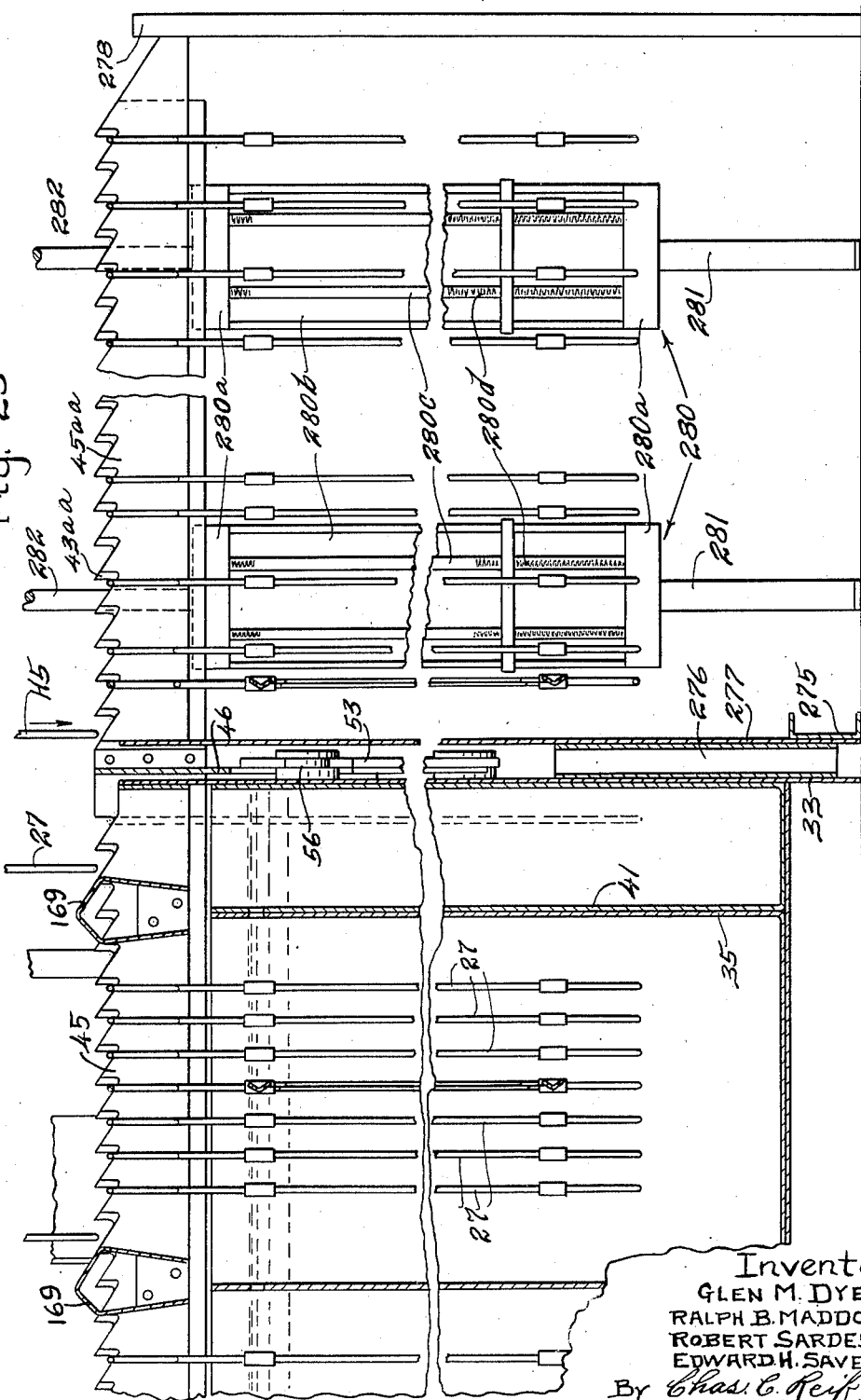

Patented Jan. 18, 1949

2,459,509

UNITED STATES PATENT OFFICE 2,459,509

FILM PROCESSING MACHINE

Glen M. Dye, Ralph B. Maddock, Robert Sardeson, and Edward H. Savela, Minneapolis, Minn., assignors to Pako Corporation, Minneapolis, Minn., a corporation of Delaware Application March 25, 1943, Serial No. 480,488

27 Claims. (Cl. 95—89)

This invention relates to a machine for handling photographic films and to one in which exposed films carried on suitable holders may be placed and which machine will automatically progress said holders to move said films through a plurality of containers of film-treating solutions, correctly position said holders and agitate said films while in said containers.

It is also an object of the invention to provide such a machine as set forth in the preceding paragraph in which the time that the film is treated in one or more of said solutions may be varied.

It is a further object of the invention to provide a machine for treating films having a magazine in which the films and holders are placed comprising a loading device for suitably positioning the holders and films in said magazine.

It is another object of the invention to provide a machine for treating films having a number of liquid containers, a movable means having a normal rate of movement for periodically lifting a film from a container and transferring the same from said container to an adjacent container together with means for decreasing the speed of said first mentioned means as it is lifting a film from a container.

Another object of this invention is to provide a pair of liquid containers, means for lifting a film from one container advancing it and lowering it into the other container with means decelerating the movement of said means as the film is lifted and accelerating said movement as said film is lowered.

It is also an object of this invention to provide a machine for treating films having a container for a film treating liquid through which the film and its holder are advanced step by step and means for positioning a holder and film thereon at different locations in said container to vary the time it is treated in said container and liquid.

It is a further object of the invention to provide a machine for treating films having a container for film treating liquid, a pick-up position, means travelling in definite cycles for picking up a film-carrying holder and placing it in said container and means for variably delivering said holder and film to said pick-up position so that it will be picked up by said means in a certain cycle.

It is also an object of this invention to provide a machine for treating films having a container for a film treating liquid, a film-carrying holder adapted to support a film in said liquid, means for advancing said holder progressively having spaced holder receiving positions and constructed and arranged to advance only one holder if more than one holder is disposed in one position.

It is a further object of this invention to provide a machine for treating films having a series of aligned containers for film-treating solutions, members at the sides of said containers having a plurality of transversely aligned film receiving means into which a film holder is intermittently and successively advanced and means for lifting and advancing said holder and film from one container to another so constructed and arranged that a holder positioned in non-aligned means will not be lifted and advanced.

It is still another object of this invention to provide a machine for treating films having a number of receptacles containing film treating solutions, a pair of toothed rails extending along each side of said containers and means for relatively moving said rails rectilinearly vertically to advance a holder supported upon and extending between the same.

It is further an object of this invention to provide a machine for treating films having a number of aligned containers for film treating liquids, pairs of toothed rails extending along each side of said containers, means for relatively and vertically moving the rails of one pair to advance a film-carrying holder supported thereon and extending therebetween and means for also moving said rails to agitate the films.

Another object of the invention is to provide a machine for treating films having a container for a film treating liquid, a film-carrying holder adapted to support the film in said liquid, means for varying by comparatively large intervals the period that the film is disposed in said liquid and additional means for varying by smaller intervals the said period.

It is also an object of the invention to provide a machine for treating films comprising a liquid container, a holder for supporting a film with said film disposed in said container, members extending along the sides of said container respectively having spaced transversely aligned holder receiving positions and means for bringing a holder into transversely aligned holder-receiving positions should it for any reason become disposed in non-aligned positions.

It is a further object of this invention to provide a machine for treating films having a number of aligned containers for film treating liquids, means for progressively advancing films through said containers and means for transferring films from one container to the next container synchronized with said first mentioned means by being controlled from the same cam shaft.

It is also an object of the invention to provide a machine for treating films comprising a plurality of containers for film-treating liquids, film-carrying holders for supporting films in said liquids, a magazine for receiving a plurality of said holders and means for progressively lifting and advancing the holders in said magazine to be transferred to said containers.

It is also an object of the invention to provide a machine for treating films having a number of containers for film-treating liquids, holders for supporting the films, a magazine for holding a plurality of said holders, means for lifting and progressively advancing the holders in said magazine and means for transferring holders from said magazine to said containers, said latter means being synchronized with said first mentioned means.

Another object of the invention is to provide a film-treating machine having arms traveling upwardly and downwardly for lifting and transfering films, said arms being freely movable upwardly and independently of their lifting and transferring movement whereby should an operator be under one or more of said arms as they descend no damage would be done and said operator would not be injured.

These and other objects and advantages of the invention will be fully set forth in the following description made in connection with the accompanying drawings in which like reference characters refer to similar parts throughout the several views and in which:

Fig. 1 is a view of the machine in front elevation;

Fig. 2 is a fragmentary detail view in elevation of the operating handle for adjusting a timing mechanism;

Fig. 3 is a view of the machine in front elevation with parts broken away to show the films during their process of development;

Fig. 4 is a partial view in transverse section of the tank supporting base and its drain trough;

Fig. 5 is a view in vertical section taken substantially on line 5—5 of Fig. 12 as indicated by the arrow, showing how the counterweights are mounted and how the film carrier is carried preparatory to being moved from one tank to another, and also showing in dotted lines the film carrier supported in the developing tank;

Fig. 6 is a view in vertical section taken substantially on line 6—6 of Fig. 1 as indicated by the arrow, thru the center of the machine showing the mounting of the cams between the supporting plates in combination with the driving means which operate the film agitating mechanism;

Fig. 7 is a partial view in vertical section taken substantially on line 7—7 of Fig. 6, some parts being shown in elevation;

Fig. 8 is a view in vertical section taken on line 8—8 of Fig. 7 as indicated by the arrows;

Fig. 9 is a view in vertical section taken on line 9—9 of Fig. 7 as indicated by the arrows;

Fig. 10 is a view in vertical section taken on line 10—10 of Fig. 11 as indicated by the arrows;

Fig. 11 is a view in vertical section taken on line 11—11 of Fig. 10 as indicated by the arrows;

Fig. 12 is a view partly in plan and partly in horizontal section of that part of the machine which contains the driving mechanism as seen in Fig. 1;

Fig. 13 is an enlarged plan view of the driving mechanism as shown in the central portion of Fig. 1, some parts being shown in horizontal section;

Fig. 14 is a front view of the cams showing their relative positions during the operating cycle of the machine;

Fig. 15 is a partial view on an enlarged scale in vertical section taken substantially on line 15—15 of Fig. 1;

Fig. 16 is an enlarged fragmentary view in elevation showing the progressing and agitating members in full and dotted lines and also showing a film holder being lifted out from its final position in the holder magazine;

Fig. 17 is a view similar to Fig. 16 showing the film from Fig. 16 being moved to the progressing and agitating members and developing tank;

Fig. 18 is a sectional view on line 18—18 of Fig. 17;

Fig. 19 is a sectional view in side elevation partly in vertical section of the film holder magazine;

Fig. 20 is a view similar to Fig. 19 showing the parts in different positions;

Fig. 21 is a plan view of the film holder magazine;

Fig. 22 is a sectional view on line 22—22 of Fig. 19;

Fig. 23 is a detail view of an adjustable film positioning device;

Fig. 24 is a partial view in side elevation of a part of the magazine used; and

Fig. 25 is a partial view in central longitudinal section showing a modification.

Referring to the drawings, a machine for treating photographic films is disclosed. The films to be handled in the machine will be carried on suitable film holders and while various types of holders could be used, in the embodiment of the invention illustrated a holder is shown such as disposed and claimed in the application of Robert Sardeson and Edward H. Savela, filed July 22, 1942, S. N. 451,940, now Patent No. 2,410,131, issued October 26, 1946. This holder 27 comprises a rod 26 having vertical side portions and a bottom portion 26b extending at right angles thereto. The rod 26 connects with another rod 27b at the top of side portions 26a and rod 27b extends laterally some distance beyond side members 26a then extends vertically and has laterally extending terminal portions 27a. Upper and lower members 28 have end portions 28a embracing rods 26a. Upper holder 28 is secured in fixed position while lower holder 28 is slidable on the side portions of rod 26. The members 28 have pivoted thereto small swinging links 29. These have projecting pins 29a upon which the film is impaled. The weight of lower member 28 places tension on the film F and this tends to swing links 29 outward and this outward component places lateral tension on the film so that the same is held nicely in one plane. The said machine is supported upon suitable members such as the longitudinally extending channels 30 shown in Figs. 1 and 5. A base plate 31 extends between and is supported on channels 30, the same being formed at its front side with a channel 31a comprising a trough. The machine also has frame members such as the end plates 32 and 33, the rear plate 34 (see Figs. 6, 12 and 13) and other portions acting as a frame and supporting means as will later appear. Rear plate 34 extends from the bottom to the top of the machine and its form in horizontal cross section is shown in Fig. 12. It will be seen that it has a forward central portion of considerable width and then extends rearwardly a short distance. Portions 34a secured thereto extend laterally, then rearwardly quite a distance and have laterally extending terminal portions 34b. As shown in Fig. 4, the machine is open at the forward part of plate 31 and said plate supports a number of tanks or liquid containers 35, 36 and 41 arranged end to end as shown in Fig. 3. Container 35 has a vertical partition 35a therein substantially midway of its ends exending to adjacent its bottom and having one or more apertures 35b adjacent its top. Tank 36 has disposed therein a plurality of smaller tanks or liquid containers 37, 38, 39 and 40. Tanks 35 and 36 are shown as connected adjacent their tops by a small conduit 36a. The containers mentioned, particularly containers 37, 38, 39, 40, 41 and 35 are adapted to hold the various solutions through which the film is passed to be treated such as the developing solution, the short stop solution, the fixing solution, the washing liquid and a wetting solution. Tank 36 will preferably contain a temperature-regulating liquid such as cool water. This tank is shown as having an overflow aperture 36b through which the liquid may pass as it is circulated. Extending along the front side of said tanks which are longitudinally aligned, is a pair of bars or rails 42 and 44 having teeth projecting from their upper edges and while these teeth might be variously formed, in the embodiment of the invention illustrated they are shown as having respectively substantially vertical sides and inclined sides or tops sloping downwardly toward the rear or discharge end of the machine. Also extending along the rear side of said tanks or containers are similar bars 43 and 45 also having similar teeth at their top edges. The teeth in the bars 42 and 43 are in alignment transversely of the machine while the teeth of the bars 44 and 45 are in alignment transversely of the machine. It will be noted however, that the teeth on the bars of the respective pairs are offset longitudinally as clearly shown in Figs. 16 and 17 as well as in Fig. 3. Bars 44 and 45 are connected at the rear end of the machine by a plate 44a and at the front of the machine by a plate 45a. Bars 44 and 45 have inwardly extending ribs 45c formed thereon. The bars 42 and 43 are arranged for vertical reciprocation and for this purpose they are connected at their ends to transversely extending plates 46 which project toward the rear side of the machine and have secured thereto small brackets 47 projecting through end plates 32 and 33 beneath which are disposed rollers 48 carried in the ends of levers 50. Levers 50 are fulcrumed intermediate their ends on the pivot members 51 carried in small brackets 52 secured to the forwardly and rearwardly extending portions 34a. The plates 46 have vertical portions at their rear sides and have secured thereagainst bars 53. The opposite vertical edges of bars 53 are disposed respectively in peripheral grooves of roller members 55 carried on studs 57 secured in the end plates 32 and 33. Said plates 46 also have front edges as shown in Fig. 15 and have short bars 54 secured thereagainst, the front edges of which are disposed in the central peripheral grooves of similar rollers 56 mounted on studs also secured in the end plates 32 and 33 respectively. Plates 46 are thus guided for vertical reciprocation. The levers 50 extend in reverse directions and the inner ends thereof, which are the ends opposite those carrying rollers 48, are pivoted respectively to links 61 and 62 which are connected at their upper ends by a stud 63 to a member 64 which extends laterally and is pivoted at its outer end on a headed and nutted bolt 65 extending between and through spaced vertical plates 66 and 67 and through plate 34 being secured by nuts 67a. Links 61 and 62 are adjustable longitudinally and for this purpose have portions threaded into the upper end portions 61a and 62a. Said rods are held in adjusted position by jamb nuts 62c and 61c. Member 64 has a cam roller 68 journalled on a stud 69 secured therein, which roller is engaged by a cam 70 carried on a cam shaft 71. Cam shaft 71 is journaled in bearings in plates 66 and 67. Cam 70 is provided with quite a number of circumferentially spaced high points 70a and at one part of its periphery is provided with a depression 70b of small radius. Cam shaft 71 is provided with a sprocket 73 over which runs a chain 74 also running over a small sprocket 75 secured to a shaft 76 (see Fig. 1) carried in a bracket 72 (see Fig. 6), secured to rear plate 34. Shaft 76 also has secured thereto a larger sprocket 77 over which runs a chain 78 also running over a small sprocket 79 secured to a shaft 80 of a reduction gear mechanism 81, mounted on a bracket 88 secured to rear plate 34. Said reduction gear also has a primary shaft 82 to which is secured a pulley 83 over which runs a belt 84 also running over a pulley 85 secured to the armature shaft 86 of the driving motor 87. Motor 87 is adjustably secured to the rear plate 34 by suitable means (not shown).

From the described structure it will be seen that as cam 70 is rotated that links 61 and 62 will be depressed, thus depressing the adjacent or inner ends of levers 50. This will raise the outer ends of said levers so that rollers 48 lift brackets 47 and plates 46. The bars or rails 42 and 43 descend by gravity when permitted by cam 70 and said bars will thus be reciprocated. After a certain number of short reciprocations caused by the high cam points or surfaces 70a the plates 42 and 43 will be allowed to descend a greater distance as cam roller 68 moves into depression 70b. This latter action and its function will be later described.

The film holders extend between the pair of bars 42 and 44 and the pair of bars 43 and 45 and the horizontal portions 27a of the holders rest between the teeth of said bars. The film held on the holder can thus depend into the liquids in the containers. The reciprocation of the rails 42 and 43 acts to advance the holder step by step along the teeth of said bars as will be later described. It will be noted that the distance the teeth on bars 42—43 and 44—45 are offset is only slightly greater than the diameter of the portions 27a of the holders and less than one and one-half times said diameter.

The machine also has means for lifting a holder with its film to remove the film from one container, advance the holder and film and lower the film into the next container, as well as to lift and place films in the first container. For this purpose a rail 90 is provided and while this might take various forms, in the embodiment of the invention illustrated it is shown as formed of a piece of sheet metal bent into channel form and having another piece of sheet metal 90a secured to its front portion. Rail 90 is thus of box form in transverse section. This rail extends substantially the entire length of the base member 31 which supports the various liquid receptacles. Said rail has secured to its rear portion adjacent the ends thereof rearwardly facing channel members 91. These members have secured therein headed studs 92 extending between the sides thereof on which are journaled grooved guide rollers 93. Rollers 93 are held in position by collars 94 secured to said studs by the screws 95 which also hold in place small clips 96 each having a lip 96a bent to be disposed in an annular groove 93a formed in the hub of roller 93. (See Fig. 12.) The roller 93 also has a larger peripheral groove in the opposite sides of which are disposed respectively the central webs of T-shaped guide standards 97 and 98. Guide standards 97 and 98 extend from the bottom of rear plate 34 to the top thereof at the rear side of the machine, and a top plate 99 illustrated as of channel form extends over the front member 98 and the rear side of the rear plate 34. Bottom plate 31 has a vertical flange 31b connected to the front sides of guide members 98. The guide members 97 and 98 are connected at their bottoms by a plate 100 and adjacent their tops are connected by a bar 101. (See Fig. 5.) As shown in Fig. 5, there are two of the studs 92 with the parts thereon in the channel member 91, the same being disposed adjacent the top and bottom of said channel member. Secured to a stud 104 which is carried in each bar 101 at each end of the machine is a sprocket or sheave 105. (See Fig. 5.) This sheave is held in place on stud 104 by a pin 106 and said stud 104 extends through guide standard 97 and has secured on one end a collar 107. Said stud is thus securely held in place. A member 108 shown as a rivet extends through one end of bar 101 through the guide standard 98 and has secured on one end a collar 109. Bar 101 is thus firmly secured to the guide standards 97 and 98. Running over each of the sheaves 105 is a flexible member such as a chain or belt 110, one end of which is secured to the collar 94 on the upper stud 92 and the other end of which is secured to a counterweight 112 which is guided in a housing 113 shown as formed of sheet metal, the same being of channel shape rectangular in horizontal cross section and having flanges 113a secured to the rear plate 34. Counterweights 112 are illustrated as being rectangular in vertical and horizontal cross section and have grooves in opposite corners in which are disposed vertical guide strips 114 secured to the inner side of housing 113. The rail 90 and parts carried thereby are therefore counterbalanced by the counterweights 112. The rail 90 is moved through a vertically elongated oblong path and for this purpose a pair of flexible members such as the chains 116 and 117 are provided. Chain 116 runs over spaced sprockets 118 mounted on studs 119 carried in spaced brackets 121 secured to rear plate 34 and extending therethrough and through a reinforcing angle 120 secured to said plate. Brackets 121 are secured in any suitable manner as by rivets 115. Chain 117 runs over sprockets 122 identical with sprockets 118 which are also supported upon studs 123 carried in brackets 125 secured to rear plate 34 and extending therethrough as well as through a reinforcing angle 124 secured thereto. Brackets 125 are secured in any suitable manner as by rivets 126. Rail 90 has a block 127 secured therein in which is journaled a pin 128 extending through and secured in a thimble 129 secured to one of the links of chain 116. The rail 90 also has secured therein a link 130 which is mounted for oscillating movement on a pin 131 secured in the front and rear sides of rail 90. A stud 132 is journaled in block 130 and has a reduced portion extending through a thimble 133 similar to thimble 127 which like thimble 127 is disposed between the sides of a link of chain 117. Pin 132 is secured in said link of chain 117. With the described construction it will be seen that rail 90 will be carried along with the chains 116 and 117 and be moved by the links to which it is secured. (See Figs. 7, 8 and 9.) The connection of chain 117 to the rail 90 is provided to give some freedom of movement as block 130 oscillates about its pin 131. This movement is provided to prevent any binding in the movement of the rail 90. Rail 90 is provided with an opening 90b to accommodate movement of link 130. As shown in Fig. 3, the chains 116 and 117 move in much elongated paths. The sprockets 118 and 122 are driven through shafts 119 and 123 respectively by the chain 78 which runs over sprockets 140 and 141 secured respectively to said shafts 119 and 123 at the rear side of plate 34. (See Figs. 1 and 12.) Chain 78 also runs over a small sprocket 143 and another small sprocket 144 spaced therefrom, said small sprockets being journaled on studs 145 and 146 secured in a slide 147. Slide 147 is movable horizontally on a guide bar 148 secured to a bracket 149, which is in turn secured to rear plate 34. Chain 78 after passing around sprocket 144 as already described, runs over the drive sprocket 79, then over large sprocket 77 and then passes over small sprocket 143. A lever 150 extends to slide 147 and has pivoted to its upper end a link 151 which is in turn pivoted on a stud 152 carried in the slide 147. Lever 150 at its lower end is journaled on a pivot bolt 153 which extends between and through plates 66 and 67 as well as rear plate 34 and is secured by nuts 159. Sleeves 153a and 153b surround bolt 153 at each side of lever 150. Said lever between its ends carries a cam roller 154 on a stud 155 secured in said lever. Cam roller 154 is engaged and acted upon by a cam 158 also mounted on cam shaft 71. Cam 158 has a recess 158a in one side of small radius while the opposite half of said cam is substantially circular. It will be seen that with each revolution of cam 158 roller 154 will move into the recess or low point 158a on the cam permitting lever 150 to move to the left and thus move slide 147 to the left. The movement of slide 147 as will be more fully later described, varies the speed of chain 78 in its movement over the sprockets 140 and 141.

The rail 90 has spaced pairs of brackets 160 secured to its top portion, said pairs being spaced along said rail, said spacing being determined by the sides of the containers 37, 38, 39, 40, 41 and 35 and partition 35a. Forwardly extending arms 161 are pivoted between each pair of brackets 160 on small pivot studs 162. As shown in Fig. 6 arms 161 are of inverted channel shape and the rear sides of said arms project to form ears which are swingingly mounted on the pivot members 162 carried in the brackets 160. It will also be seen that said arms can be freely swung upwardly about pivots 162. The arms 161 extend quite a distance forward and each has a depending arm 163, the lower end of which is bent inwardly and upwardly to form a projection 163a. Said projection 163a is provided with a central recess 163b of general V-shape in form. (See Fig. 16.) Arms 164 are also secured to the rear portion of rail 90, the same being in central vertical alignment with the arms 161. Said arms 164 are held in place by headed screws 165 extending through a central slot in each of said arms, the arms being supported by the end of the slot engaging the upper screw 165. Said slot extends below the lower screw 165 so that said arms may be freely pushed upwardly for quite a distance. Arms 164 have their lower ends bent upwardly and forwardly to form an upwardly extending projection 164a which is provided with a central recess 164b similar to the recess 163b and arm 163. Recesses 163b and 164b are in alignment transversely of the machine. The arms 163 and 164 move with rail 90 in its vertically elongated path and are constructed and arranged to lift the film holders as they reach certain positions on bars 42 and 45 and in the magazine to be later described. A guide plate and shield 168 extends between the pairs of rails 44 and 45 having substantially vertical sides extending into and in close proximity to the adjacent ends of receptacles 35 and 40. The top of member 168 is of angular formation as clearly shown in Fig. 3. Members 169 similar to member 168 have their sides extending into the adjacent ends of tanks 37—38, 38—39, 39—40, over partition 35b and between tanks 35 and 41. Members 168 and 169 are secured at their end portions to bars 44 and 45. A member 170 similar to members 168 and 169 is also disposed at the forward end of the machine and has one side extending into the end of receptacle 37 with its other side extending over end plate 32. The top sides of member 170 extend at substantially equal angles to the horizontal and said member is disposed at somewhat greater height than members 168 and 169, the tops of all of said latter members being substantially in one horizontal plane.

A plate 172 has portions 172a disposed at the front ends of bars 42 and 43, the said portions having a short top front horizontal surface and a much longer downwardly inclined surface 172b the latter having a length equal to the length of several of the teeth on said bars.

Plate 172 is movable vertically and for this purpose it has formed therein guide slots 172c through which extend headed members 173 which are secured to end plate 32. Plate 172 has a vertical front edge 172d which is disposed in and guided in a grooved stud 182 secured in end plate 32. In the lowest position of member 172 the surfaces 172b align with the inclined surfaces of the end teeth on bars 42 and 43 as shown in Fig. 16. When plate 172 is raised surfaces 172b can be brought respectively into alignment with the inclined surfaces of the teeth next to the last tooth on bars 42 and 43 and with the teeth immediately adjacent thereto. For raising plate 172 it has connected thereto by a bolt 174 one arm of a bell crank lever 175 pivoted on a stud 176 supported in member 53. A compression coiled spring 178 surrounds stud 176 and a washer 179 engages the top of said spring, being held in place by a suitable pin or other means passing through stud 176. Lever 175 has an arm 175a equipped with a knob handle 175b at its upper end and said arm 175a passes through a slot 180a in a plate 180, secured to the upper end of plate 53. At the rear side of slot 180a are spaced projections 180b forming recesses in which the lever arm 175a may be disposed. By moving said arm forward against the tension of spring 178 said lever 175 can be moved into any one of three positions and it will be held therein by spring 178. (See Figs. 1 and 21.) Plate 172 can thus be held in any one of its three positions.

In Fig. 25 the machine is shown as having an extension of the advancing or progressing rails so that the films may be carried past dryers or through a drying apparatus. In said figure a base channel 275 extends transversely of the machine beyond end plate 33, being spaced therefrom by a vertical channel member 276. A plate 277 (see Fig. 25) is secured to channel 275 and member 276 and will extend between extensions of inner rails 44 and 45. The extension of inner rail 45 is designated 45aa. This rail as above described, is stationary and the extension 45aa will be connected at one end to plate 277 and at its other end to an end frame or plate 278. Extensions of the movable rail 43 is indicated as 43aa and this will be connected to plate 46 to which rails 43 and 42 are connected. The rails 42, 43 and 44, 45 are thus continued beyond end plate 33 and the holders and films will be raised by the last arm 160 as shown in Fig. 3 and will be delivered to the rails beyond plate 277. This is indicated by the portion of holder H5 which is indicated by the arrow as being lowered onto the extensions of plates 42, 43 and 44, 45. The holders and films will thus be progressed on the said extensions in the operation of the machine. Drying members 280 are supported upon bottom standards 281 and top standards 282 in a suitable frame and these are disposed at either side of said rails. While various kinds of drying devices could be used, in the embodiment of the invention illustrated a dryer such as disclosed and claimed in the application of Robert Sardeson, S. N. 408,111, filed August 23, 1941, now Patent No. 2,369,803, issued February 20, 1945, is shown. This device comprises upper and lower frame pieces 280a which may be of glass extend between frame members 280a and carry the electrical heating elements 280d. As the holders with the films thereon are progressed past the dryers 280 they will be properly dried and the holders can then be removed from the progressing rails at the ends thereof or they can be delivered to some suitable holder by the rails.

From the above description it will be seen that the rails 42, 43 and 44, 45 can thus be extended and the films dried while they are being progressed on the rails.

A magazine is provided for receiving and supporting quite a number of holders. This includes a pair of stationary plates 190 connected at their front ends by a transverse plate 191. Plates 190 are connected to end plate 32 by small brackets 188 and 189. The plates 190 have spaced teeth 190a at their upper edges formed substantially as are the teeth on the rails or bars 42 to 45. The plates 190 are in longitudinal alignment with the plates 44 and 45 respectively. Disposed adjacent each plate 190 is another plate 192, which plates 192 are in longitudinal alignment with the bars or rails 42 and 43 respectively. Plates 192 also have the teeth 192a at their upper ends similar to the teeth 190a. The upped ends of the teeth on plates 190 and 192 lie in an arc. The teeth on the pair of plates 190 are in transverse alignment and the teeth on the plates 192 are in transverse alignment. The teeth on bars 190 are however, some distance out of transverse alignment with the teeth on plates 192 as shown in Figs. 1 and 3. Said distance is slightly more than the transverse dimension of portion 22a of the holder and preferably less than one and one-half times said dimension. The portions of plates 190 adjacent the machine have downwardly inclined rather long surfaces 190b. The adjacent portion of plates 192 have offset surfaces thus forming notches 192d and 192e. Surfaces 190b extend to and merge in curved form with a vertical surface 190c at one side of an upwardly extending projection 190d formed on the end of each plate 190 adjacent the machine. The notches or recesses 190f formed by surfaces 190b and 190c, receive the film-carrying holder and this is what may be called the pick-up position for the holders. They are picked up from this position by the adjacent pair of arms 163 and 164 and placed in the first or adjacent tank 37. Plates 190 have inwardly projecting ribs 190i thereon adjacent their tops, said ribs being of V-shape in cross section. Small lugs 192j project outwardly from each plate 192 below surfaces 190b.

The outer plates 192 are arranged for vertical reciprocation and are provided with spaced guide slots 192b, the upper ends of which have passing therethrough the grooved studs 195 secured in the plates 190. The portions of plates 192 at the sides of slots 192b are disposed in the grooves in said studs. A shaft 196 extends between plates 190 and is journaled in bearings 189a carried in brackets 189, said shaft having secured to one end thereof at the rear side of the machine a bell crank lever 199. One arm of this lever carries a roller 200 journaled on a stud 201 secured in said arm. Roller 200 has a central peripheral groove and the adjacent plate 192 has a horizontal edge 192c disposed in said groove. An arm 202 is secured to the other end of shaft 196 and has carried thereon a roller 203 similar to roller 200 and carried on a stud carried in arm 202. Roller 203 likewise has a central peripheral groove and the other plate 192 has a horizontal edge 192c disposed in said groove. The edges 192c are in horizontal alignment. The other arm 199a of bell crank lever 199 is apertured and has extending therethrough one end portion of a rod 205. Said end portion is threaded and has thereon a nut 206 engaging the lower side of arm 199a. Rod 205 extends to and is pivotally secured to a lever 207 having a hub or sleeve pivoted on a bolt 208 secured to and extending between plates 66 and 67 and through rear plate 34, said bolt having nuts 208a on its ends. The upper end of rod 205 is threaded and has adjustably secured thereto a head portion 205a which is apertured to receive a stud 210 extending therethrough and through lever 207. A jamb nut 211 is disposed on rod 205 and engages head portion 205a. A cam roller 212 is carried on lever 207, being journaled on a stud 213 secured in said lever and on arm 207f of said lever. Cam roller 212 has a central peripheral groove and is adapted to be disposed in engagement with any one of three cams 214 formed on a cam body 214a secured to cam shaft 71 in any suitable manner as by the set screw 215. The lever 207 has a block 207a secured thereon which carries a slide 207b which has a rectangular groove therein in which is disposed a guide bar 217 extending between and having its ends extending through the plates 66 and 67 and held therein by nuts 218. One of said ends of bar 217 extends through rear plate 34 and one nut 218 engages said plate. It will be seen that plates 66 and 67 are connected and secured to plate 34 by the described members passing therethrough. A cover bar 207c is secured to slide 207b so that said guide bar 217 is enclosed. Slide 207b is provided on its top with a rack 207d, which rack is engaged by a pinion 219 carried on a shaft 220, which shaft is journaled in small brackets 221 secured to the rear of plate 66. Adjacent one bracket 221 shaft 220 has secured thereto in any suitable manner as by a pin 222 a member 223 having an upwardly projecting arm 223a. A shaft 224 is disposed in axial alignment with shaft 220 and has secured thereto in any suitable manner as by a pin adjacent member 223, a member 225. Member 225 has a hub portion 225a journaled in a cylindrical recess formed in the outer side of member 223 so that member 225 and shaft 224 are supported by member 223 and thus by bracket 221. Member 225 has a plate-like portion 225b extending upwardly therefrom of considerable width. Plate portion 225b has pivotally secured thereto by studs 229 a pair of arms 230 disposed at either side of portion 223a and having ears 230a projecting therefrom so as to engage the sides of portion 225b. Arms 230 also have small lugs 230c engaging the opposite sides of portion 223a. Arms 230 also have lugs 230b which are connected by a coiled tensile spring 227. The shaft 224 extends to the end of the machine and has secured thereto a crank handle 231 having projecting inwardly therefrom a pin 232 which can be disposed in any one of three holes 233, 234 and 235. When crank arm 231 is moved it turns shaft 224 and through the connection with shaft 220 as will be later described, it places the latter under tension so that pinion 219 tends to move rack 207d thus tending to move lever 207 to bring cam roller 212 into alignment and engagement with any one of the cams 214. When cam roller 212 is engaged by one of the cams 214 lever 207 is moved, thus moving rod 205 to swing bell crank lever 199 and arm 202 to move rollers 200 and 203 upwardly, thus raising plates 192. This reciprocation of plates 192 acts to advance a holder carried in the teeth at the top of plates 190 and 192 a distance of one tooth toward the machine.

A loading device is provided for placing the holders in position in the magazine formed by plates 190 and 192. The outer end portions of plates 190 have top surfaces 190g adjacent the teeth 190a and a shallow recess 190h is formed at the outer end of each surface 190g. The surfaces 190g extend upwardly and rearwardly a short distance and then substantially horizontally, the same having a small recess 190i formed therein just adjacent the inclined surface of its first tooth recess. The plates 192 have surfaces 192k adjacent surfaces 190g and which substantially align therewith at their forward portions. However, surfaces 192k continue in an upwardly inclined position beyond the horizontal portions of surfaces 190g and then have vertical surfaces 192m which connect with the downwardly inclined surface of the first tooth recess in plates 192. Surfaces 192k and 192m are connected by a curved portion forming a rounded corner. The loading device includes a pair of arms 240 disposed at either side of the outer plates 192 and at some distance therefrom, said arms being secured at their lower ends to a shaft 241 journaled in brackets 242 suitably secured to the plates 192. The arms 240 are swingable as a unit about the axis of shaft 241 and at their tops are connected by a rod 243. Secured to rod 243 adjacent each end thereof and adjacent plates 190, and swinging with rod 243 are arms 245. These arms have projecting therefrom toward the end of the machine narrow portions 245a of arcuate form and having curved top surfaces. The arms 240 have secured thereto at their upper ends plates 246 having vertical top portions disposed at right angles to each other and forming angles facing inwardly. Plates 246 have lower portions 246a adjacent the outer sides thereof which slope downwardly and inwardly and have other lower portions 246b adjacent their end portions which slope downwardly and toward the machine. The arms 240 are also connected by a plate 247 having a main vertical portion, the top of which is bent substantially at a right angle to form a narrow top portion or flange. Plate 247 with said narrow flange at its top, forms a handle or operating means which may be grasped by the operator for swinging the loading device. A tensile coiled spring 249 is secured to the lower side of one arm 245 and is secured at its other end to a stud 250 secured in one arm 240 some distance below the arm 245. Said arm 245 and thus shaft or rod 243, are placed under tension holding the arm in the position shown in Fig. 19. Arms 245 each have a downwardly extending projection 245b at their forward sides.

Extending along the outer side of one of the plates 192 is a plate 255 which is supported by the stationary plates 190. Plate 255 has an arcuate lower edge provided with ratchet teeth 255a directed toward the outer side of plates 192. The adjacent lever 240 has pivoted thereto on a stud 256 a bell crank lever 257. Lever 257 has a top arm from which projects upwardly a pawl 257a. Lever 257 has connected thereto below stud 256 a tensile coiled spring 258 connected at its other end to lever 240. Spring 258 thus tends to swing lever 257 to elevate pawl 257a. Said lever is held in normal position by an adjustable screw 261 carrying a lock nut 262, which screw 261 is carried in a projection 257b of lever 257. When plates 192 are in their lower position pawl 257a cannot engage the ratchet teeth 255a but when plates 192 are raised said pawl is brought into engagement with said ratchet teeth and prevents movement of arms 240, as will be later described. A vertically extending narrow member 260 is provided in front of member 162 and acts as a guard. At the discharge end of the machine a member 263 is shown. There will be one of these members at each side of the machine and they will extend longitudinally substantially in alignment with bars 44 and 45. They can be parts of a dryer to which the films are delivered or parts of a storage device or a conveying mechanism. The machine will automatically deliver the holders and films to said members so that further handling can be had as desired.

The film which is exposed is placed on the holder as described, it being understood that the machine will be located in a dark room. The operator takes the holder and drops or places it between plates 246 at the front of the machine. The holder is guided by the surfaces 246a and 246b so that it comes to the position shown in Fig. 21, the same having its portions 27a resting on the tops of surfaces 190g and 192k of plates 190 and 192. The ribs or projections 190i are provided so that if a holder is introduced between plates 190 it will be roughly centered in position. If the loading device is to be used the operator now takes hold of the plate 247 and swings the loading device toward the machine. This swings arms 240 and members 245 are moved with the arms. As arms 240 and members 245 are moved toward the machine the holder is engaged and moved along the surfaces 190g and 192k. The end portions of the holder thus ride up on the portion of surfaces 192k above the horizontal portions of plates 190g and when they reach the end of surface 192k they drop therefrom onto the top of the rearwardly extending arcuate portions 245a of members 245. They are carried over the tops of the teeth 190a and 192a on these portions 245a. When the members 245 move far enough projection 245b engages the projection 192j and this swings plates 245 about the axis of rod 243 and against the tension of spring 249. When plates 245 are so swung the portions 245a are moved and the holder moves off of these portions so that it is no longer supported on members 245 and it drops into the recess between the last two teeth on members 190. In Fig. 19 the members 245 are shown in dotted lines as moved to discharging position. The holder is thus discharged and is disposed against the vertical surface of the last tooth on plates 190. This is the position designated H1 in Fig. 17. When the film-carrying holder is thus discharged the operator swings the loading device back to initial position. Another holder can now be placed as before and the loading device again swung toward the machine. Upon this operation the projection 245b instead of engaging the projections 192j will engage the sides 27a of the holder previously placed in position and the holder in the loading device will then be discharged into the recess in front of the next to the last tooth or against the vertical surface of the next to the last tooth which is the position H2 as shown in Fig. 17. The loading operation can be continued and the projection 245b will engage the ends of the last holder put in position until the magazine is completely filled with holders as shown in Fig. 20. At this time the loading device cannot be moved as projection 245b engages the holder in the outer end position and the holder in the loading device will merely be supported upon surfaces 190g and 192k and cannot be moved far enough to move off of surfaces 192k. This is shown in Fig. 20. Even though plates 245 are in discharging position the holder is still on surfaces 192k. When the loading device is swung rearwardly or toward the machine and the holder has been moved off of surfaces 192k, said device can be reversed and moved forwardly and the holder will again ride up on surfaces 192k.

As stated, the outer plates 192 are periodically and vertically reciprocated. It will be seen that when a holder is placed on the plates 190 that it will occupy the bottom of the recess between adjacent teeth. When the outer plates 192 are moved upwardly the ends of the holder will be engaged by the inclined surface of the teeth 192a and the holder will be lifted from the recess between the teeth 190c. When so lifted the holder and the ends thereof slide down on the inclined surface of the teeth 192a so that it occupies the recess between said teeth. When plates 192 descend the ends of the holder now engage the upper end of the inclined surface on the teeth 190a and as plates 192 descend below the top of plates 190 the holder and the ends thereof slide down into the recess between teeth 190c. The holder has thus been moved forward one tooth and now occupies the recess between the teeth 190c adjacent to the one in which it last occupied and the next one toward the machine. At each reciprocation of plates 192 therefore, all holders in the magazine are moved forward the distance of one tooth. The holder occupying position H1 is lifted by the inclined surface on the last full tooth on plates 192 and slides down into the recess 192d. As plates 192 descend this holder engages surface 190b and slides down thereon until it meets the recess 192e which has not yet passed below surface 190b. The holder is retained in recess 192e until plates 192 are fully descended to the position shown in dotted lines in Fig. 17 at which time it will be seen that recess 192e has moved below surface 190b and the holder then slides down against surface 190c and into recess 190f which is the final position in the magazine and as above stated, this could be called the pick-up position. The steps or recesses 192d and 192e are provided so that the holder will be gradually lowered into the pick-up position 190f. If it were permitted to slide down all the way on the surfaces 190b it would strike surface 190c with too much force, and might cause swinging of the holder and film. The holder and film are advanced quite a distance to give ample room for removal.

The ratchet member 255 is provided to prevent operation of the loading device and thus swinging of the arms 240 while the outer plates 192 are moved upwardly. When said plates are raised pawl 257a is brought into engagement with the ratchet teeth 255a and if the operator attempts to swing the loading device forward this will be prevented by the engagement of said pawl and ratchet bar 255. It would be objectionable to use the loading device while the holders are being advanced in the magazine.

As above stated, the rail 90 moves through a vertically elongated path which is the path of chains 116 and 117. The arms 161 as well as the pick-up arms 163 and 164, partake of this movement. In each of said movements the members 163 and 164 adjacent the magazine move downwardly and into position beneath the ends 27a of the holder in the pick-up position and if there is a holder in said position it will be engaged between the surfaces 163b and the similar surfaces on arms 164 and will be lifted as the rail 90 and said arms continue in their upward movement. When the arms and rail move forwardly and descend in the other side of their path, said holder will be deposited on the top inclined surfaces 172b. If this member is in its lowest position as shown in Fig. 16, then the holder will be placed in the first recess between the teeth on the bars 42 and 43. If the member 172 is in intermediate position the holder will be guided into the second recess from the front ends of bars 42 and 43. If member 172 is in its uppermost position the holder will be guided into the third recess from the front end of bars 42 and 43. It will thus be seen that the initial position of the holder in the first tank can be varied. Since the holder is progressed step by step the distance of one of the teeth it will thus be seen that the time the film is in the first container or in the developing solution can be varied by the movement of member 172. The member 170 acts as a guide to insure the film will be properly directed into the tank 37 as it is lowered after having been lifted from the pick-up position. Ribs 45a act as a centering means or guides for the film holders.

As above described by the revolution of cam shaft 71 cam 70 engages roller 68 and this through the links 61 and 62, and through the levers 50 reciprocates vertically the rails 42 and 43. As the several high points 70a engage roller 68 rails or bars 42 and 43 are given a number of short reciprocations. The rails are given this short vertical reciprocation to agitate the film as it is carried on the holder and disposed in the various liquids or solutions. When cam roller 68 moves into the depression 70b of cam 70 the bars 42 and 43 are given an extra movement and move down below the tops of bars 44 and 45. When bars 42 and 43 thus move down the ends 27a of the holder which have been supported in bars 42 and 43 engage the upper end of the inclined surfaces of a pair of aligned teeth on the bars 44 and 45 and the holder slides down these surfaces into the recess between the teeth and against the vertical surface of the next tooth in a rearward direction. When bars 42 and 43 again move upward the ends 27a of the holder are engaged by the inclined surfaces on a pair of aligned teeth on each of said bars and lifted above bars 44 and 45 so that the holder then slides forward a short distance on the teeth of bars 42 and 43 and against the vertical surfaces of the next teeth in a rearward direction on bars 42 and 43. The holder which has thus been advanced the distance of one tooth remains on the bars 42 and 43 while they are given quite a number of the previously mentioned short vertical reciprocations. The film is thus again agitated. In another revolution of cam shaft 70 bars 42 and 43 will again be lowered and the holders will again be moved forward the distance of one tooth. The holders are thus progressed until they come into the position which is the position at the rear of each of the receptacles and when they reach this position they will be lifted by a pair of the arms 163 and 164. As clearly shown in Fig. 3 it will be seen that there is a pair of the arms 163 and 164 and one of the arms 161 at the end of each of the containers. When therefore, the holders reach the end position in each of the containers they are lifted, advanced toward the rear of the machine and lowered into the next container. It will be noted that the distance the bars 42 and 44 are longitudinally offset is just slightly greater than the diameter of end portions 27a of the film holder. This distance should not be greater than one and one-half times said diameter. If for any reason two or more holders should get into a recess between the teeth only one of these will be lifted and advanced. The points of the teeth on bars 42 and 43 will pass between the holders so that only one will be lifted and thus moved. The machine thus acts to separate, distribute and properly advance a plurality of holders occupying one tooth recess. The shields 169 are provided so that any liquid dripping from the films will be guided into the tanks and the holders and films properly guided as they descend. As shown in Fig. 3, the rear inclined top surfaces of members 168 and 169 are flush with the inclined surfaces on adjacent teeth. While the timing of the various parts might be varied in one embodiment of the machine in actual practice the timing is such that rails 90 and hence chains 116 and 117, pass through three cycles for one revolution of cam shaft 70. As the rail 90 moves upward in the cycle for lifting the holders and films to transfer the films from one tank to the next it is desirable to retard the movement of the rail so that additional time will be given for the liquid to drip from the films before they are advanced. It is for this purpose that lever 150 and slide 147 are provided. In each revolution of cam shaft 71 the roller 154 can move into the depression 158a of said cam. It will be noticed that approximately two-thirds of the cam periphery is formed on one radius. As roller 154 begins to move toward depression 158a lever 150 can move to the left as shown in Fig. 1. This permits slide 147 to move to the left, carrying with it sprockets 143 and 144. The travel of the chain is as indicated by the arrows, so that pinion 79 is pulling the chain around sprocket 77 at the lower side thereof. Sprocket 77 is thus pulling the chain over sprocket 143 and the motion transmitted to chains 116 and 117 is thus determined by the chain travelling over sprocket 140. As the slide 147 moves to the left chain is in effect fed toward sprocket 140 and the driving effect of the chain on this sprocket is reduced. This results in slowing up the movements of chains 116 and 117. The movement is so timed that the reduced speed takes place on chains 116 and 117 as they are moving upwardly in the cycle, to elevate rail 90 and lift film from the tanks. This gives additional time for the solution to drip from the film. It will also be noted that as cam 158 continues to rotate there will be an acceleration of the speed of chains 116 and 117 over their normal speed. This is caused by cam moving roller 154 and lever 150 away from cam shaft 71, moving slide 147 and pulling chain away from sprocket 140 in addition to the pull of sprocket 77. This compensates for the period in which chains 116 and 117 were retarded and the parts are kept in the desired synchronism. The increased speed takes place as the film is lowered into the next container. It is not desirable to have the wet film too long exposed to the atmosphere. If a film is too long exposed a dimming known as "aerial fog" may take place. The films are thus lowered quickly. As stated, chains 116 and 117 make three complete trips around their sprockets or move through three complete cycles for one revolution of cam shaft 71. The movement of rail 90 is synchronized with the movement of bars 42 and 43 so that a holder is delivered or moved into the end position of each tank just before the arms 163 and 164 come around to pick-up position in the cycle in which they are retarded in their upward movement. They go through two cycles or make two round trips without being retarded but no holder is lifted from a tank in these two cycles or trips. By having all movements controlled from one cam shaft perfect synchronization is secured.

The movement of plates 192 to advance the holders in the magazine to deliver a holder to the pick-up position is also synchronized with the movement of chains 116 and 117 and thus with the movement of rail 90. As stated three cams 214 are provided. These cams are constructed with cam surfaces approximating a cylinder for most of their extent but each has a high point. These cams are set with the high points 120 degrees apart. Each cam also has in its side flange a depression or opening 214d of sufficient depth to permit roller 212 to pass laterally across the cam. The particular cam 214 which is to operate roller 212 is determined by the position of the crank 231. When this crank is moved to place pin 232 in one of the holes 233, 234 and 235 shaft 224 is oscillated as is plate 225b and if the oscillation is to the left as shown in Fig. 10, the plate will move the arm 230 by a lug 230a and place tension on spring 227, thus placing tension on or pulling arm 230 against the portion 223a of member 223. Member 223 thus tends to oscillate and move shaft 220 which is placed under tension to cause pinion 219 to move slide 207b and thus to move lever 207 with cam roller 212. As soon as shaft 71 comes into position with roller 212 transversely aligned with one of the recesses 214d which recesses are 120 degrees apart, pinion 219 will move said parts and bring roller 212 into alignment with the next adjacent cam selected by lever 231. Should roller 212 move from end cam 214 to another end cam as when lever 231 is moved from hole 233 to 235 roller 212 will have to move through two of the recesses 214c. The roller 212 will thus be brought into alignment with the desired cam 214. It will be likewise seen that if shaft 224 is oscillated to the right as seen in Fig. 10, that plate 225b will move the other arm 230 and again place spring 227 under tension so that roller 212 will be moved in the opposite direction. Roller 212 can thus be changed at will to be in alignment with any one of the cams 214 and to be operated by any one of the cams. It will be seen that there may be a delay after lever 231 is moved before roller 212 moves into alignment with the selected cam. This delay is provided so that more than one holder cannot be placed in position HI, or the pick-up position in one revolution of cam shaft 71. In other words, plates 192 can only be given one vertical reciprocation in one revolution of cam shaft 71. It will be seen that as one of the cams 214 rotates when the high point engages roller 212 lever 207 will be moved, thus moving rod 205 and rocking bell crank lever 199. This, through rollers 200 and 203, elevates the plates 192. As stated, the cam shaft in one practical embodiment of the machine, makes a rotation in one minute. As the rail 90 goes through three cycles in one minute, the pick-up arms 163 and 164 pass the pick-up point or position every 20 seconds. It will be seen that if a holder carrying a film is in the pick-up position when the pick-up arms make the first of three cycles, the film will be transferred to the first tank on the first trip or cycle of the pick-up arms. If the pick-up arms make the first trip and there is no holder in the position to be picked up the arms merely move idly. If a holder is fed into the pick-up position before the arms come around on the second trip, then the holder will be picked up on the second trip and transferred to the tank. It will also be seen that the film that was placed in the tank on the second trip will be in the tank 20 seconds less time than a film which might have been picked up on the first trip of the pick-up arms. Likewise, if there is no film in position to be picked up when the arms make their first two trips the arms will merely move idly. If a film is fed into the pick-up position after the second trip so that it will be picked up on the third trip and transferred to the tank this film will be in the tank 40 seconds less time than a film which might have been transferred on the first trip of the pick-up arms. The cams 214 are synchronized with the movement of the pick-up arms so that when crank 231 is in one position the holder will be fed by relative movement of plates 190 and 192 so that it will be picked up on the first trip of the pick-up arms. When the crank 231 is in its next position the holder will be fed into the pick-up position so that it will be picked up in the second trip of the pick-up arms and when the crank 231 is in its third position the holder will be fed into the pick-up position so that it will be picked up on the third trip of the pick-up arms. It will thus be seen that the time that the film is in the developing solution can be varied in two ways. It can be varied by varying the position of member 172 and it can be varied by the mechanism controlled by crank arm 231. By moving the member 172 the holder carrying the film can be put into the first tooth recess, the second tooth recess or the third tooth recess. Since the bars or rails 42 and 43 advance the film at one minute intervals the time the film is in the developing solution can be varied 1, 2 or 3 minutes. A finer adjustment or an adjustment at smaller intervals can be had by operation of crank 231 so that a variation of twenty second intervals can be had for the period that the film is in the developing solution.

When the holders are properly placed in the magazine or on the rails 42 and 43 they will extend between aligned teeth as shown in Fig. 2. The machine has been particularly designed for processing X-ray films which are now largely used in industry and hospitals. Some institutions develop thousands of films a day. Such X-ray films are usually of large size. It may happen that when a doctor or some other person is anxious to look at the film he will remove the holder and film from the developing tank or one of other tanks during its processing. In replacing the holder it may carelessly be placed so that instead of extending between aligned teeth it will extend between non-aligned teeth or in a diagonal position. A holder so placed will continue to be advanced in a diagonal position until it reaches the end position in a tank. When one end reaches the end position or pick-up position it will be engaged by one of the pick-up arms 163 or 164 and lifted. The holder will not be lifted out of the tank however, as it will slip off of the pick-up arms at one end and drop back onto the bars 42 and 43. If one of the pick-up arms 163 or 164 lifts one end of the holder, this end is lifted while the other end is supported on the toothed rails at the opposite side. The holder is thus canted as it is lifted or extends in a diagonal direction. This will continue until the distance of the diagonal is greater than the width of the holder and it will then slip off of the pick-up arm which is lifting one end and will drop back onto the toothed rails below said arm. This action by the pick-up arms merely results in more agitation. The progress of the holder will continue therefore, until it is brought to the end of the tank in which its film is disposed. It cannot be advanced beyond this position as it is blocked by one of the members 168 or 169 and merely drops back in the same tooth recess. The progress of the holder will continue until both ends of the holder reach the end position and they are then in aligned recesses. When the holder reaches this position it will be properly picked up by the pick-up arms 163 and 164. It will thus be seen that the machine will not pick up an improperly placed film holder. The improperly placed holder is first brought into proper position and is then lifted and advanced. Since bars 42 and 43 make one advancing movement to three cycles of rail 90 the proper synchronism is maintained.

The arms 161 are mounted on the pivots 162 and can swing freely upwardly. This provision is made so that should an operator or other person or some object get under one of the arms when it is descending it will merely swing up and will not injure the person nor will any damage be done to the object or the machine. The pick-up arms 164 also can move upwardly freely and this will prevent anyone getting his hand or fingers pinched between said arm and the top of the bars 43 and 45. Said arms 164 would also be moved up by any object getting thereunder, thus preventing damage. Member 260 is provided to keep a holder from swinging and bringing its film into contact with member 172.

The holders with the films thereon may be placed in any of the aligned recesses between the teeth on members 190 and 192. It is not necessary that they be placed so as to be positioned by the loading device. The use of the loading device is thus optional.

From the above description it will be seen that we have provided a machine for processing films particularly X-ray films, which operates entirely automatically after the films and holders are placed therein. The film is carried through the various processing solutions and as above described, may be also dried. The film holders can be quickly positioned and loaded into the magazine. Said holders are automatically progressed in the magazine and move to the pick-up position from which they are transferred to the liquid containers. The progression of the holders in the magazine is synchronized with the transfer of the holders to the liquid containers. The holder as described, is automatically moved successively through the tanks containing the different liquids used for treating the film. The progressing rails are simple and are of small transverse dimension. This is a desirable feature. The solutions will get onto the rails more or less and with the present structure the rails will not become clogged or gummed up with any residue from the solutions. The rails at each side of the tanks are far enough apart to prevent this and yet they are sufficiently close to operate properly and form a desirable compact structure. The progression of the holders is accomplished with a simple vertical movement of one set of rails.

The machine as above described, comprises means whereby the period that the film is in the developing liquid can be varied. This period can be varied in comparatively large intervals as one minute intervals or it can be varied in much smaller intervals such as 20 second intervals. As described, the films are lifted slowly from the receptacles to give ample opportunity for the liquid to drip or drain therefrom as they are removed from each receptacle. The films are quickly submerged in the next liquid container after having been so lifted and drained. The machine as described, takes care of an improperly placed holder so that the holders are brought to proper position and they can be lifted and transferred from such proper position. An improperly positioned holder will not be lifted to be transferred or advanced to the next liquid container. If more than one holder occupies a recess in the progressing rails only one holder will be moved and progressed. Since the lifting and transferring means moves through several cycles to one cycle of the progressing means two or more holders will not be advanced to the last position in any container. As the holder is progressed by the rails and slides down on the inclined portion of the rail teeth it strikes the vertical portion of the teeth causing a slight jar on the holder and film. This is advantageous as it will jar loose any air bubbles which might have formed on or collected on the surface of the film.

Another desirable feature of the machine is that all of the operating parts and parts requiring lubrication are disposed at the rear of the machine and at the rear of the liquid receptacles. There is no chance therefore, of any lubricating oil or grease dripping onto the films or into the receptacles. The receptacles can be serviced at the front of the machine and any necessary operations on the mechanism can be performed at the rear of the machine. The plumbing for the various receptacles is quite accessible from the front of the machine. The operating parts are clearly and easily accessible at the rear of the machine. This is shown well in Fig. 1.

The various operations such as the advancing of the films in the mechanism, the progression of the films on the rails and the lifting and transferring of the films from one receptacle to another are all controlled from cams secured to one cam shaft. This means that all of these operations can be positively and definitely synchronized. Since all parts are controlled from the one cam shaft there is no danger of the parts getting out of synchronized operation in the use of the machine.

As above described the overhanging arms for lifting the films and the rear arms for lifting the films can move upward easily so that no damage or injury will result should an object or person be in the path of these arms as they descend.

The provision of the small trough at the front of the machine which is formed on the bottom or supporting plate insures that no liquid will collect on this plate and be retained and become stagnant.

It will also be obvious that the machine is quite compact and considering the functions performed occupies a comparatively small space. The adjustment controls are disposed in a very convenient location for use by the operator and these are easily manipulated. The device has been amply demonstrated in actual practice and found to be very successful and efficient.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A film treating machine having in combination, a plurality of aligned liquid containers, a pair of members extending along the sides respectively of said containers, each having transversely aligned upwardly extending projections at their top sides, a second pair of members extending along the sides respectively of said containers also having transversely aligned upwardly extending projections at their top sides, a film-carrying holder extending between said pairs of members carrying a film disposed in one of said containers, said holder being supported by said members in the recesses between said projections, said projections having downwardly inclined sides along which said holder will move by gravity, said inclined sides in said pairs of members being longitudinally offset and means for periodically relatively moving said pairs of members rectilinearly vertically to alternately lift said holder so that it is alternately supported by the members of said pairs and slides forwardly longitudinally on said inclined sides and is thus progressed.

2. The structure set forth in claim 1, and means for additionally moving one of said pairs of members between the operations of said means to reciprocate said holder rectilinearly vertically for agitating the film carried thereby and disposed in one of said containers.

3. The structure set forth in claim 1, the projections on said pairs of members having substantially vertical sides at the ends of said inclined sides, said holders striking and being stopped by said vertical sides on one pair of said members after sliding down the inclined sides of said other pair of said members.

4. A film treating machine having in combination, a plurality of aligned liquid containers, a pair of members extending along the sides respectively of said containers each having transversely aligned upwardly projecting teeth at their top sides, a second pair of members extending along the sides respectively of said pair of members also having upwardly extending substantially pointed teeth, the top surface of said teeth on all of said members sloping downwardly toward one end of said members, a film-carrying holder extending between said pairs and adapted to be supported in recesses between said teeth, said teeth being offset on said pairs longitudinally a distance slightly greater than the transverse dimension of said holder where said holder engages said members and means for relatively moving said pairs of members rectilinearly vertically to advance said holder thereon whereby due to said offset distance only one holder will be advanced if a plurality of holders are disposed in said recess.

5. A film treating machine having in combination, a liquid container, pairs of bars extending along the sides respectively of said containers, said bars having upwardly projecting teeth on their upper edges, each having a downwardly inclined edge, the teeth in each pair of bars being offset longitudinally from the teeth in the other bar of said pair, said bars being adapted to support a film carrying holder having a film disposed in said container, said holder extending between said pairs, means operating at fixed times for relatively vertically reciprocating said bars of each pair rectilinearly to bring the teeth of one bar of each pair above the teeth on the other bars of each pair to advance a holder.

6. The structure set forth in claim 5 and means for more rapidly and additionally reciprocating a pair of said bars a lesser distance between said times to agitate said film carried in a holder supported on said bars.

7. A film treating machine having in combination, a magazine having a plurality of spaced means for supporting a plurality of holders with films depending therefrom, a loading device in which film-carrying holder is supported movable over said means, said loading device being movable to a discharge position and comprising mechanism for discharging said holder into one of said means of said magazine upon reaching said position.

8. A film treating machine having in combination, a magazine for supporting a plurality of film-carrying holders having a plurality of holder-supporting positions, a movable loading device for suitably positioning holders in said magazine and movable over said positions to a discharge position, a pivoted support on said device for a holder, yielding means normally holding said support in operative position, and means for swinging said support to discharge a holder when said device reaches said discharge position.

9. A film treating machine having in combination, a magazine comprising members having a plurality of means for receiving film-carrying holders, a holder supported on one of said means, means for moving said members for advancing said holder thereon, a movable loading device for positioning a holder in one of said first mentioned means of said magazine and means for preventing movement of said device when said second mentioned means is operating to advance said holder.

10. A film treating machine having in combination, a liquid container, means extending along the sides of said container and having a plurality of transversely aligned stations, one of which constitutes a discharge station, a holder constructed and arranged to extend between said stations and be supported therein on said means and means for lifting and transferring said holder operative to engage said holder only when it is in said discharge position whereby should said holder extend between non-aligned stations it will not be lifted and transferred.

11. A film treating machine having in combination, a plurality of aligned liquid containers, a pair of members extending along the sides respectively of said containers each having upwardly extending projections at their top sides, said projections being transversely aligned in said members and having downwardly inclined sides, a second pair of members extending along the sides respectively of said containers also having upwardly extending projections at their top sides transversely aligned in said members of said second pair, said projections having downwardly inclined sides, a holder extending between said pairs of members carrying a film disposed in one of said containers, said holder being supported by one pair of said members in the recesses between said projections, said projections on one of said pairs of members being substantially pointed and longitudinally offset from the projections on said other pair of members a distance greater than the transverse dimension of the portion of said holder supported by said members but less than one and one half times said dimension and means for vertically reciprocating rectilinearly one of said pairs of members to bring the projections thereon above and below the projection on the other of said pair of members whereby said reciprocated members will lift only one holder if two holders are disposed in the recesses between said projections.

12. A film treating machine having in combination, a magazine for supporting a plurality of film carrying holders and having a series of holder-supporting positions for supporting holders side by side, a loading device movable over said positions having a supporting means for carrying a film-carrying holder, a contact means connected to said supporting means, an abutment positioned adjacent one of said positions to be engaged by said contact means, said supporting means being arranged upon engagement of said contact means with said abutment to be moved to discharge said holder.

13. A film treating machine having in combination, a magazine from which film holders are fed to a processing machine comprising means for supporting film holders and having a plurality of spaced positions in which film holders are disposed side by side, a loading device adapted to carry a holder movable from one end of said means over said positions to discharge a holder into any one of said positions, said loading device having a discharge mechanism operated by movement of said device for discharging a holder into one of said positions and contact means on said device for operating said discharge mechanism.

14. A film treating machine having in combination, a receptacle adapted to contain a film treating solution, means for supporting in a certain position, a film holder to be picked up and transferred to said receptacle means for removing said holder from said position and delivering it to said receptacle, said means being successively movable past said position at fixed intervals for so removing a holder, and means for delivering a holder to said position at different times relatively to said intervals so that it will be picked up in different movements of said second mentioned means.

15. A film treating machine having in combination, a plurality of containers disposed end to end, members extending along the sides of said containers having transversely aligned means for supporting ends of holders carrying films disposed in said containers, means including a rotating shaft for relatively moving said members to advance said holders step by step through said containers, means for lifting said holders from the end of one container, moving them and lowering them into the adjacent end of the adjoining container operated from said shaft, a magazine at one end of said containers having spaced pairs of members adapted to receive and support the ends of said holders carrying films and means operated from said shaft for relatively moving said last mentioned members to advance holders step by step in said magazine and deliver a holder to said first mentioned members.

16. The structure set forth in claim 15, said second mentioned means including endless members running over rotating members and having substantially vertical side portions and means operated from said shaft for accelerating said endless members as a portion thereof moves along one of said sides and decelerating the same as said portion moves along the other of said sides.

17. A film treating machine having in combination, a container adapted to contain film treating solution, stationary members at each side of said container having transversely aligned teeth with downwardly inclined top portions, said bars being adapted to support between said teeth the ends of a film holder from which a film depends into said container, a movable bar at each side of said container, said movable bars having transversely aligned teeth with downwardly inclined top portions and adapted to support between said teeth the ends of a film holder, the teeth of said movable bars being offset longitudinally relatively to the teeth on said stationary bars and means for reciprocating said movable bars vertically rectilinearly to bring the tops thereof above and below the teeth on said stationary bars whereby a holder carried between the teeth of said movable bars will be raised above said stationary bars and when said movable bars descend below said stationary bars said holder will be deposited on the inclined tops of the teeth of said stationary bars and will slide down the same so that said holder is intermittently progressed.

18. The structure set forth in claim 17, a magazine for holding a plurality of film holders and having spaced stationary bars with transversely aligned teeth and downwardly inclined top portions and adapted to support a film holder between said teeth, spaced movable bars having teeth with downwardly inclined tops and adapted to support a film holder between said teeth, the teeth on said movable bars being offset longitudinally from the teeth on said stationary bars and means for vertically reciprocating said movable bars rectilinearly to bring the teeth thereon above and between the teeth on said last mentioned stationary bars operated from said first mentioned means whereby said first mentioned movable members and said bars of said magazine are operated in synchronism.

19. A film treating machine having in combination, a container adapted to contain a film treating solution, a member having a receiving position adjacent said container for a film holder adapted to carry a film, means operating successively through cycles for removing a holder from said receiving position and delivering the same to said container, said cycles being of equal extent in time, a magazine for holding a plurality of spaced film holders and means for advancing film holders in said magazine and delivering one of the same to said receiving position in different relations to said cycles.

20. A film treating machine having in combination, a magazine for holding a plurality of film holders comprising spaced members having transversely aligned receiving means for said holders, a loading device for said magazine comprising a member pivoted to swing relatively to said means, means carried by said member for carrying a holder and swingable with said member over said means to place a holder in any one of said means and means operated by movement of said device for discharging a holder from said second mentioned means to any one of said positions.

21. A machine for treating films having in combination, a plurality of containers for film treating liquids, means for transferring a film from one of said containers to another including an endless member having an upwardly moving side and a downwardly moving side, a rotating member over which said endless member runs and by which it is driven, a second endless member for driving said rotating member, spaced rotating members over which said second endless member runs, a slide disposed between said spaced rotating members, rotating members on said slide over which said second endless member runs, a pair of driving sprockets over which said second endless member runs and means for moving said slide toward one or the other of said driving sprockets.

22. A machine for treating films having in combination, a plurality of containers, means for supporting a film holder carrying a film disposed in one of said containers, means for advancing said holder step by step to move said film through a container, including a cam, a shaft to which said cam is secured, means for moving said holder to transfer a film from one of said containers to another including a sprocket secured to said shaft, means for delivering a film holder to said first mentioned means, a plurality of cams on said shaft for selectively operating said last mentioned means and means for selecting and rendering operative one of said cams.

23. A film treating machine having in combination, a magazine having pairs of spaced members having a series of transversely aligned positions for supporting a holder carrying a film, means for vertically moving one of said pairs of members to advance a holder from one of said positions to the next position, a loading device for said magazine comprising a means adapted to carry a holder and swingable over said positions and including a member constructed and arranged to place a holder in one of said positions, a rack, and a member on said loading device engageable with said rack when said pair of members is being moved vertically to prevent movement of said device during said vertical movement.

24. A film treating machine having in combination, a container for holding a film treating solution, means for supporting and advancing a film through said container in timed steps from an initial to a discharge position, a member having a receiving position adjacent said container, means for delivering a film to said receiving position, means for picking up a film at said receiving position and delivering the same to said initial position, and means for varying the period during which said film will occupy said receiving position before being picked up therefrom.

25. A film treating machine having in combination, a container for holding a film treating solution, means for supporting and advancing a film through said container in timed steps from an initial to a discharge position therein, means for picking up a film from said receiving position and delivering the same to said initial position, said first mentioned means making a plurality of trips past said receiving position between two successive steps of advancement of said film, and means for determining in which of said trips said film will be picked up.

26. A film treating machine having in combination, a container adapted to hold a film treating solution, pairs of members extending along the sides of said container for supporting a film holder carrying a film adapted to depend into said container, means for relatively moving said members for advancing said holder step by step to move said film through said container, a magazine for supporting a plurality of film-carrying holders, pairs of notched bars extending along the sides of said magazine, means for relatively moving said notched bars for lifting and advancing holders in said magazine, means for directing a holder from said magazine to said first mentioned members, a lever for operating said second mentioned means, a plurality of cams, a driving shaft on which said cams are mounted, a lever engaged by said cams, a link connecting said levers, and means for rendering any one of said cams operative, said cams being constructed and arranged to cause delivery of a holder to said members at different times relative to the cycles of said means.

27. A film treating machine having in combination, a container adapted to hold a film-treating solution, a pair of members extending along the sides respectively of said container, each having notches at their upper sides, said notches having downwardly inclined sides, a second pair of members extending along the sides respectively of said container also having notches in their upper sides, the sides of said latter notches inclining downwardly, said downwardly inclined sides in said respective pairs of members being offset transversely of said container, means for relatively moving said pairs of members rectilinearly vertically to advance a holder thereon, links for operating said last mentioned means, a cam roller for moving said links, a cam engaging said roller, a shaft on which said cam is secured, means for lifting, advancing and lowering said holder to transfer a film thereon from one of said containers to another container comprising endless chains, means for operating said last mentioned means including a sprocket secured to said shaft, a magazine for containing a plurality of said holders, means for advancing holders in said magazine and feeding a holder to said pairs of members, and a cam for operating said last mentioned means secured to said shaft.

GLEN M. DYE.
RALPH B. MADDOCK.
ROBERT SARDESON.
EDWARD H. SAVELA.

(References on following page)

REFERENCES CITED

The following references are of record in the file of this patent:

UNITED STATES PATENTS

| Number | Name | Date |
|---|---|---|
| 610,781 | Whiteley | Sept. 13, 1898 |
| 797,445 | Lyon | Aug. 15, 1905 |
| 816,323 | Hillstrom | Mar. 27, 1906 |
| 839,719 | Broderick | Dec. 25, 1906 |
| 1,061,667 | Gerhard | May 13, 1913 |
| 1,158,386 | Oiler | Oct. 26, 1915 |
| 1,187,744 | Keller | June 20, 1916 |
| 1,233,934 | Taylor, Jr. | July 17, 1917 |
| 1,309,919 | Tone | July 15, 1919 |
| 1,670,673 | Williams | May 22, 1928 |
| 1,675,795 | Cope | July 3, 1928 |
| 1,842,890 | Williams | Jan. 26, 1932 |
| 1,863,689 | Dye | June 21, 1932 |
| 1,866,124 | Oertli | July 5, 1932 |
| 1,919,199 | Camerota | July 25, 1933 |
| 1,921,206 | Oertli | Aug. 8, 1933 |
| 2,004,410 | Houch et al. | June 11, 1935 |
| 2,103,901 | Gordon | Dec. 28, 1937 |
| 2,124,106 | Dye | July 19, 1938 |
| 2,138,095 | Gordon | Nov. 29, 1938 |
| 2,143,116 | Todd | Jan. 10, 1939 |
| 2,143,117 | Todd | Jan. 10, 1939 |
| 2,157,128 | Hershberg | May 9, 1939 |
| 2,175,788 | Todd | Oct. 10, 1939 |

FOREIGN PATENTS

| Number | Country | Date |
|---|---|---|
| 51,952 | Austria | July 15, 1911 |
| 497,042 | France | Aug. 28, 1919 |